United States Patent [19]

Given et al.

[11] 4,326,263
[45] Apr. 20, 1982

[54] METHOD AND APPARATUS FOR CONTROLLING A PLURALITY OF LIKE EQUIPMENTS

[75] Inventors: Arthur P. Given, Roanoke, Va.; Michael F. O'Meara, Fos-Sur-Mer, France

[73] Assignee: General Electric Company, Salem, Va.

[21] Appl. No.: 485,571

[22] Filed: Jul. 3, 1974

[51] Int. Cl.³ .................................................. G06F 15/46
[52] U.S. Cl. ...................................... 364/900; 364/300
[58] Field of Search ........................... 340/172.5; 444/1

[56] References Cited

U.S. PATENT DOCUMENTS

| | | | |
|---|---|---|---|
| 3,686,639 | 8/1972 | Fletcher et al. | 340/172.5 |
| 3,701,113 | 10/1972 | Chace et al. | 340/172.5 |
| 3,753,243 | 8/1973 | Ricketts et al. | 340/172.5 |
| 3,798,612 | 3/1974 | Struger et al. | 340/172.5 |
| 3,806,877 | 4/1974 | Kiffmeyer et al. | 340/172.5 |
| 3,810,104 | 5/1974 | Markley | 340/172.5 |
| 3,810,118 | 5/1974 | Kiffmeyer et al. | 340/172.5 |
| 3,827,030 | 7/1974 | Seipp | 340/172.5 |
| 3,829,842 | 8/1974 | Langdon | 340/172.5 |
| 3,832,696 | 8/1974 | Nakao et al. | 340/172.5 |
| 3,849,765 | 11/1974 | Hamano | 340/172.5 |

OTHER PUBLICATIONS

Gunnarsson, L., "Program for Simulation of Relay Networks", Nordisk Tidskrift For Informationsbehandling, vol. 7, Issue 2, 1967, pp. 91–95.

*Primary Examiner*—Raulfe B. Zache
*Attorney, Agent, or Firm*—Arnold E. Renner; Robert E. Brunson; James H. Beusse

[57] ABSTRACT

A programmable data processor or controller serving as the main control in a control system contains an executive program for controlling the transfer of information between the processor and system equipment, updating that information during on-line control of the equipment and modifying the executive program to change operating parameters of the system while the data processor is controlling the system equipment. Modification of the executive program and displaying of system parameters related to the executive program and the system equipment is accomplished through the use of an operator's console which communicates with the data processor and system equipment as a result of operator intervention.

9 Claims, 1 Drawing Figure

4,326,263

METHOD AND APPARATUS FOR CONTROLLING A PLURALITY OF LIKE EQUIPMENTS

BACKGROUND OF THE INVENTION

1. Field of the Invention

This invention relates generally to computerized process control systems and more particularly to a programmable computer or controller having a program for simulating control circuitry for controlling a plurality of equipment units, all sharing a common control circuit.

2. Description of the Prior Art

Programmable digital computers or controllers for controlling industrial processes have been in use for years. More recently, several special purpose programmable controllers have been developed which function in industrial control systems of the type normally utilizing relay logic to perform required control functions.

Typically, the documentation utilized to show how the relays and their contacts are interconnected to depict the control logic is in the form of an electrical schematic (circuit) diagram. The format of one type of electrical schematic resembles a ladder, commonly referred to as a ladder diagram. The ladder diagram is comprised of two vertical spaced buses each connected to an appropriate power supply terminal (+and −). Horizontal circuit conductors are connected between the vertical buses, giving the circuit the appearance of a ladder.

Each circuit conductor normally includes a relay (coil) as a last element which is preceded by one or more switch elements (e.g. relay contacts) which control the energization and de-energization of the relay to generate an output signal in accordance with continuity established through the horizontal conductor. AND functions can be performed by connecting switch elements in series in a horizontal conductor while OR functions can be performed by connecting switch elements in parallel. Thus, the switch elements can be considered to represent logic elements for performing Boolean logic functions.

In general design practices, after the ladder diagram has been completed, a control system is wired corresponding to that diagram. The switch and relay elements of a circuit conductor may be operated by or operate other switch and relay elements in system. To define these other elements, each element on the diagram is labeled with a reference. With these labels on the diagram, the circuit interconnections can easily be determined by referring to the diagram.

Many industrial processes have several like equipments (e.g. motor drives) which have the same operating parameters. That is, each equipment operates in the same manner so that the control logic for each of the equipments can be the same.

In present day hardwired and programmable controllers, separate control logic circuitry must be implemented to control each of those like equipments because each provides its own distinct output signals and requires its own distinct input signals. Since each equipment requires its own control circuitry, controller cost is increased because of circuit redundancy. In the present invention this redundancy and high cost is overcome in a programmable computerized control system.

SUMMARY OF THE INVENTION

Accordingly, it is an object of this invention to provide a programmable controller system having enhanced operating capabilities.

another object is to provide a computer controller utilizing a program including a simulated control circuit for controlling a plurality of like equipment units.

Yet another object of the invention is to provide a programmable computer including an executive program to direct communication with an operator console connected to the computer whereby the console, under an operator's intervention, displays the operating status of the system.

Another object is to provide a programmable controller having a program including a control program comprised of a plurality of simulated control circuits, one of the control circuits serving to control a plurality of like equipment units and the other circuits each serving to control additional equipment units.

In carrying out the present invention a programmable computer or the like is programmed to simulate circuitry which performs the function of an industrial controller. The computer contains suitable programming for directing communication between equipment units external to the computer and further includes a control program which simulates at least one control circuit for controlling the equipment units. The simulated control circuit is comprised of instruction words, each including a portion defining an operation to be performed and an address portion referencing an addressable location in the computer capable of storing representations of operating parameters of the equipment. In the preferred embodiment, the instruction words of the control circuit simulate the aforementioned relay logic circuits (ladder diagram), however Boolean logic functions may also be simulated.

At least one of the control circuits is appropriately associated with a plurality of equipment units of the like kind. Further, representations of input and output operating parameters representative of input and output signal conditions of the equipments of like kind are stored in a plurality of correspondingly designated addressable locations in the computer memory. These parameters are stored such that, like parameters of like equipments are in respective locations of the memory, the locations differing from each other by index factors or constants associated with each of the like equipments.

In the operation of the invention, the simulated control circuit instruction words are sequentially retrieved from the memory to perform operations as specified by each instruction. The address portion of a retrieved instruction word is combined with the index factor associated with one of the like equipments than being controlled to develop a parameter address corresponding to that like equipment, whether it be to an input parameter or an output parameter.

In a first instance, utilizing the parameter address, the presentation of the appropriate operating parameter is then retrieved from the memory. Using the retrieved representation of the appropriate operating parameter, the operation defined by each retrieved instruction is then performed. For each input parameter addressed, a result derived from a logical operation specified by an instruction word, is accumulated. In a second instance, for each output parameter addressed, the result of the accumulation of one or more logical operations is stored as representation of an output parameter for the like kind of equipment associated with that output parameter.

The above described operations are repeated by continuing to execute the instruction words of the simulated control circuit for the other equipments of like kind, whereby each of the output parameters of the equipments are updated in accordance with the accumulated status resulting from the logical operations specifid by the retrieved instruction words, those instruction words each operating on the parameters are specified by the index factor combined with each instruction word's address portion.

BRIEF DESCRIPTION OF THE DRAWING

While the novel features of this invention are set forth with particularity in the appended claims the invention both as to organization and content will be better understood and appreciated along with other objects and features thereof from the following detailed description taken in conjunction with the drawings in which:

Figure 1:
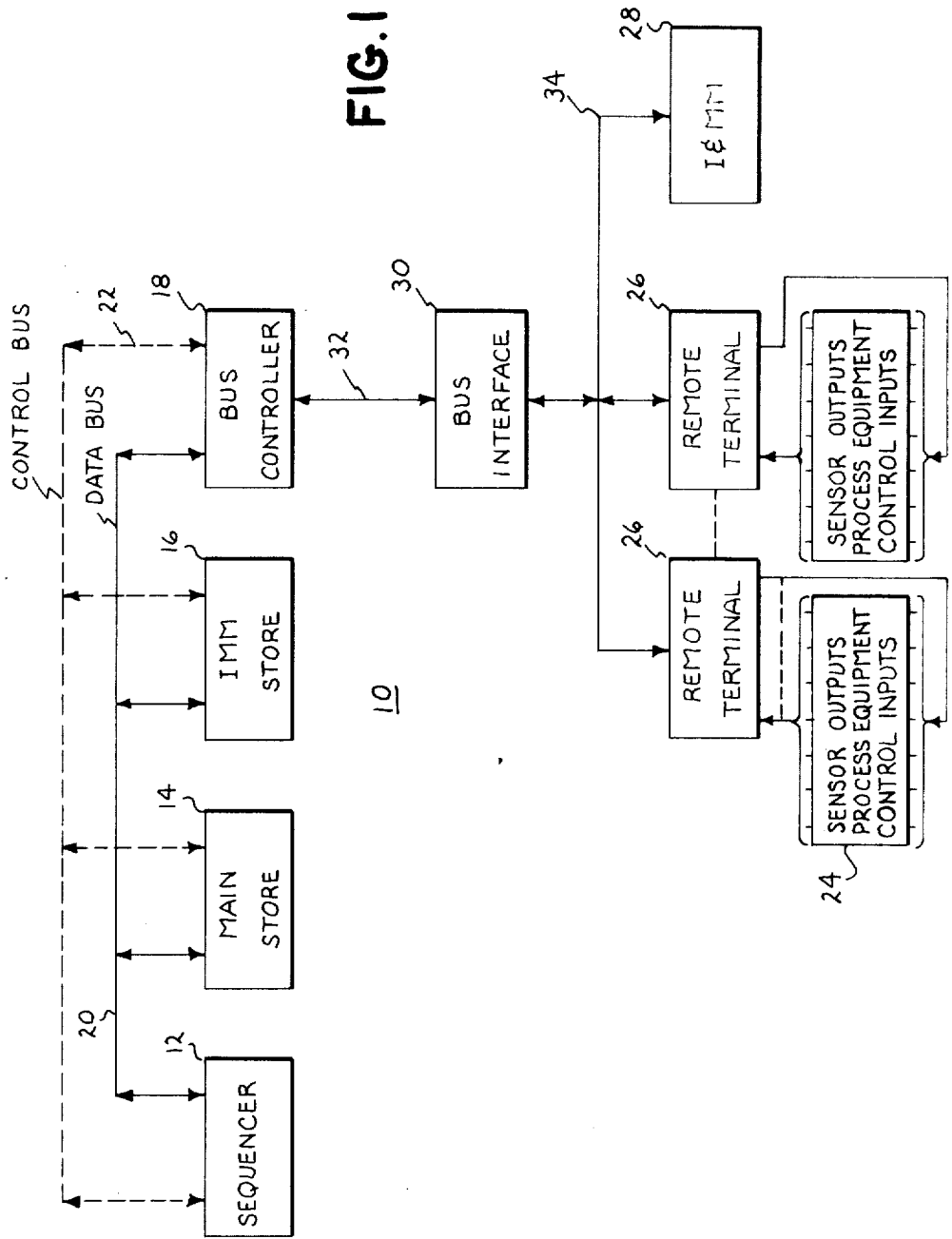
FIG. 1 is a major block diagram of a programmable data processor control system of the type disclosed herein.

For a complete description of the system of FIG. 1 and of our invention, reference is made to U.S. Pat. No. 3,969,722, "Method and Apparatus for Operator Interrogation Of Simulated Control Circuits" by William J. Danco and Arthus P. Given, issued July 13, 1976 and assigned to the assignee of the present invention. More particularly, attention is directed to FIGS. 2 through 29 and 31 through 67 of the drawing and to that part of the descriptive portion of the specification starting at Column 2, line 58 and continuing through the end of Column 150 (including the incorporated U.S. Pat. Nos. 3,921,146 and 3,924,240) and further including Appendix A (beginning at the bottom of Column 150 and continuing into Column 170 and Appendix B (beginning in Column 170 and continuing to the claims in Columns 223 and 224) all of which are incorporated hereinto by reference and made a part hereof as if fully set forth herein.

We claim:

1. A method of developing control parameters for a plurality of like equipments through the use of a data processing system having an executive program for directing communications between the equipments and the data processing system and further including a store for the storage of instructions and data comprising the steps:
   (A) storing a simulated control circuit appropriate to all of said like equipments by instruction words, each including a portion defining an operation to be performed and an address portion;
   (B) storing representations of operating parameters for each of said like equipments in a plurality of designated address locations, like parameters of like equipments being stored in respective locations which differ from each other by an index factor associated with each like equipment;
   (C) retrieving the stored instruction words sequentially from said store to perform the operations thereby specified;
   (D) combining the address portion of the instruction word retrieved with the index factor associated with the equipment then being controlled to develop a parameter address;
   (E) retrieving the representation of the appropriate operating parameter utilizing said parameter address;
   (F) performing the operation defined by each retrieved instruction word using the retrieved representation of the appropriate operating parameter to thereby develop a control parameter for an equipment; and,
   (G) repeating the steps of C, D, E and F above for each of said equipments being controlled.

2. The invention in accordance with claim 1 wherein the index factor for the first of said like equipments is zero.

3. The invention in accordance with claim 2 wherein the index factor for each succeeding like equipment differs from that for the previous equipment by one.

4. The invention in accordance with claim 1 further including the step of displaying the address of an instruction word and the state of the appropriate operating parameter as specified by that instruction word's parameter address in response to manually operable means specifying that to be displayed.

5. A method of developing operating parameters for a plurality of like equipments through the use of a data processing system having an executive program for directing communications between the equipments and the data processing system and further including a store for the storage of instructions and data comprising the steps:
   (A) storing a simulated control circuit appropriate to all of said like equipments, said circuit comprised of one or more logic strings, each of said logic strings including at least one switch element and one continuity status element said elements being represented by a plurality of instruction words forming a series, each series defining a string of elements, and each instruction word including a portion defining an operation to be performed and an address portion, the last instruction word in a series relating to the continuity status element;
   (B) storing representation of operating parameters for each of said like equipments in a plurality of designed address locations, like parameters of like equipments being stored in respective locations which differ from each other by an index factor associated with each like equipment;
   (C) retrieving the stored instruction words sequentially from said store to perform the operations thereby specified;
   (D) combining the address portion of the instruction word retrieved with the index factor associated with the equipment then being controlled to develop a parameter address;
   (E) retrieving the representation of the appropriate operating parameter utilizing said parameter address;
   (F) performing the operation defined by each retrieved instruction word relating to a switch element in a string using the retrieved representation of the appropriate operating parameter whereby a result is accumulated representative of the state of the simulated continuity status element;
   (G) storing the represented state of the simulated continuity status element as an operating parameter for an equipment at a designated address location specified by that instruction word's parameter address;

(H) repeating the steps of C, D, E, F and G above for each of said equipments being controlled.

6. The invention in accordance with claim 5 wherein the index factor for the first of said like equipments is zero.

7. the invention in accordance with claim 6 wherein the index factor for each succeeding like equipment differs from that for the previous equipment by one.

8. The invention in accordance with claim 5 further including the step of displaying the address of an instruction word and the state of the appropriate operating parameter as specified by that instruction word's parameter address in response to manually operable means specifying that to be displayed.

9. A method of controlling a plurality of like equipments through the use of a data processing system having an executive program for directing communications between the equipments and the data processing system and further including a store for the storage of instructions and data, said data being stored in the form of representation of equipment operating parameters comprising the steps of:

(A) storing a simulated control circuit appropriate to all of said like equipments, said circuit comprised of one or more logic strings, each of said logic strings including at least one switch element and at least one continuity status element, by instruction words each including a portion defining an operation to be performed and an address portion;

(B) providing in said store first and second areas including representation of output and input operating parameters, respectively, of each of said like equipments in a plurality of address locations in each area, like parameters of like equipments being stored in respective locations in the respective areas which differ from each other by an index factor associated with each like equipment;

(C) sequentially retrieving the stored instruction words relating to the switch elements of a string from said store to perform the operations thereby specified;

(D) combining the address portion of an instruction word retrieved with the index factor associated with the equipment then being controlled to develop an output operating parameter address;

(E) retrieving the representation of the appropriate output operating parameter utilizing said parameter address;

(F) performing the operations defined by each sequentially retrieved instruction word relating to a switch element using the retrieved output representations of the appropriate operating parameters, whereby the results of the operations of the retrieved instruction words are accumulated as a representation of the state of said continuity status element;

(G) retrieving an instruction word relating to the continuity status element;

(H) storing the representation of the state of said continuity status element as an input operating parameter of each of said like equipments in a location in said second area in accordance with the last retrieved instruction word's parameter address;

(I) repeating steps C, D, E, F, G and H above for each of said equipments being controlled; and, (J) retrieving the stored state of said continuity status element to effect control signals for application to the appropriate equipment to govern the operation thereof.

* * * * *